United States Patent [19]

Artiglia et al.

[11] Patent Number: 5,619,321
[45] Date of Patent: Apr. 8, 1997

[54] METHOD OF AND DEVICE FOR MEASURING THE KERR NON-LINEARITY COEFFICIENT IN A SINGLE MODE OPTICAL FIBER

[75] Inventors: Massimo Artiglia, Turin; Ernesto Ciaramella, Rome; Bruno Sordo, Dogliani, all of Italy

[73] Assignee: CSELT -Centro Studi e Laboratori Telecommunicazioni S.p.A., Turin, Italy

[21] Appl. No.: 608,481

[22] Filed: Feb. 28, 1996

[30] Foreign Application Priority Data

Apr. 13, 1995 [IT] Italy .................................. 95A000290

[51] Int. Cl.$^6$ ........................... G01N 21/84; G01N 21/41
[52] U.S. Cl. ................................................. 356/73.1
[58] Field of Search ............................................ 356/73.1

[56] References Cited

PUBLICATIONS

Measurement of the Nonlinear Index of Silica–Core and Dispersion Shifted–Fibers K. S. Kim et al and Reed et al, 15, Feb. 94/vol. 19, No. 4/Optics Letters.

Nonlinear Coefficient Measurements for Dispersion Shifted Fibers Using Self-Phase Y. Namihira et al, Electronics Letters, 7 Jul. 1994, vol. 30, No. 14.

Fiber Nonlinearity, Tkach, AT&T Bell Lab., Nonlinear–Index Measurement by SPM OFC '95 Technical Digest.

*Primary Examiner*—Vincent P. McGraw
*Attorney, Agent, or Firm*—Herbert Dubno

[57] ABSTRACT

A train of rectangular pulses is sent into a fiber, which pulses have such a wavelength that fiber operates under anomalous dispersion conditions, such a peak power as to cause modulation instability in the fiber and such a ratio between duration and repetition period that the average power is lower than the threshold at which stimulated Brillouin effect takes place. The maximum value of instability gain is measured in the spectrum of the pulses exiting the fiber and the Kerr non linearity coefficient is obtained from the maximum measured value of modulation instability gain by minimizing the error, in the range of power values used for the measurement, with respect to a theoretical curve expressing such maximum gain as a function of the peak power. The device to realize the method is also provided.

5 Claims, 2 Drawing Sheets

METHOD OF AND DEVICE FOR MEASURING THE KERR NON-LINEARITY COEFFICIENT IN A SINGLE MODE OPTICAL FIBER

SPECIFICATION

1. Field of the Invention

The invention described herein relates to the characterization of optical fibers. More particularly an object of the invention is to provide a method of and a device for measuring the non-linearity coefficient in a single mode optical fiber.

2. Background of the Invention

In most materials of interest for optical communications, one of the main non-linear phenomena is the Kerr optical effect, which acts on the refractive index making it depend on optical intensity I according to the formula:

$$n(I)=n_0=n_2 \cdot I \tag{1}$$

where n(I) is the refractive index as a function of the intensity (and therefore of the power) of the radiation sent into the fiber, $n_0$ is the linear refractive index (constant), while $n_2$ is the so-called non-linear coefficient of the refractive index (also known simply as the non-linear refractive index).

Due to the introduction of optical amplifiers in optical communication systems, the powers transmitted along a fiber make non-linear effects associated with $n_2$ no longer negligible. Such effects can cause significant degradation in the performance of a system or, conversely, they can be exploited for certain advantages. It is thus important to know them precisely. In the case of optical fibers, non-linear effects are generally characterized in terms of the so-called Kerr non-linearity coefficient $\gamma$, which takes into account also light confinement inside the fiber and therefore yields information that is more useful, from the operational point of view, than that provided by the nonlinear refractive index $n_2$, which is a parameter depending solely on the material. Coefficient $\gamma$ is given by relation $$\gamma=(2\pi/\lambda)\cdot(n_2/A_{\mathit{eff}}) \tag{2}$$

where $\lambda$ is the wavelength and $A_{\mathit{eff}}$ is the effective area of the fiber core, which is a parameter providing a measure of the optical confinement of light inside the fiber. From the value of $\gamma$ it is therefore possible to obtain the value of $n_2$, once $A_{\mathit{eff}}$ is known. The mathematical expression of parameter $A_{\mathit{eff}}$ is well known to those skilled in the art and therefore it is not necessary to report it here.

Several methods for determining $\gamma$ or $n_2$ are known. The methods most commonly used entail sending high power optical pulses into the fiber and analyzing the spectrum of the pulses coming out of the fiber in order to measure non-linear phase shift $\Phi_{NL}$ produced by each pulse on itself (self phase modulation). This phase shift is due to the fact that the pulse modifies the refractive index of the fiber, as indicated by relation (1), and it is linked to coefficient $\gamma$ by the relation $\Phi_{NL}=\gamma\cdot P\cdot L$, where P is the pulse power and L is the fiber length. The pulses used are generally very short, to obtain the peak powers required, and the product of pulse width $\Delta\tau$ and spectral line width $\Delta\nu$ must be such as to make the pulse transform limited.

Example of such methods are described in the papers "Measurement of nonlinear index of silica-core and dispersion-shifted fibers", by K. S. Kim et al., Optics Letters, Vol. 19, No. 4, 15 February 1994, pp. 257 et seq., "Nonlinear coefficient measurements for dispersion shifted fibers using self-phase modulation method at 1.55 µm", by Y. Namihira et al., Electronics Letters, Vol. 30, No. 14, 7 July 1994, pp. 1171–1172, and in the paper "Nonlinear-index measurement by SPM at 1.55 µm", by R. H. Stolen et al., presented at OFC'95, San Diego (USA), 26 February–2 March 1995, paper FD1.

Methods based on self phase modulation assume that the time profile of the pulse remains unchanged in the course of the propagation. However, in general the effect of the dispersion introduced by the fiber cannot be neglected. In fact, in order to obtain easily detectable phase shifts, given the limited powers of the sources, it is often necessary to use relatively long sections of fiber and/or very narrow pulses. Values obtained with the measurement must then undergo numerical processing to take into account the dispersion effect and this processing not only makes the determination of $\gamma$ more complex, but is also in turn a cause of errors, since it is based on simplified models of fiber behavior.

OBJECT OF THE INVENTION

It is an object of the invention to provide a method and a device which just exploit the dispersion introduced by the fiber to obtain an accurate measurement of $\gamma$.

SUMMARY OF THE INVENTION

More specifically, the invention is based on a typical manifestation of the optical Kerr effect, the so-called "modulation instability". This phenomenon occurs when a continuous, high-power optical signal is sent through a fiber under anomalous dispersion conditions (i.e. when the wavelength $\lambda$ of the signal exceeds the zero dispersion wavelength $\lambda_0$ of the fiber). As an effect of this phenomenon, the continuous wave becomes unstable (hence the name of the effect) and two gain side bands are generated in the optical spectrum; these side bands are symmetrical with respect to the carrier and their maxima are separated from the carrier by a frequency $\Omega_M$. If signal power P can be considered constant (i.e. if attenuation introduced by the fiber can be neglected), maximum gain G in these bands is linked through $\gamma$ only to power P and it is given by $$G=e^{2\gamma PL} \tag{3}$$

where L is the length of the fiber. If, however, attenuation is not negligible, then a relation analogous to relation (3) applies, in which actual length L is replaced by $a \cdot L_{\mathit{eff}}$, where $L_{\mathit{eff}}$ is the effective length of the fiber, given by $L_{\mathit{eff}}=(1-e^{-\alpha L})/\alpha$ ($\alpha$=linear attenuation coefficient) and $\underline{a}$ is a coefficient roughly equal to 1 and depending weakly upon $\alpha$ and L under standard measurement conditions.

According to the method, a train of rectangular pulses is sent into the fiber, the pulses having such a wavelength that the fiber functions under anomalous dispersion conditions, such a peak power as to cause modulation instability in the fiber and such a ratio between duration and repetition period that the average power is lower than the threshold at which the stimulated Brillouin effect takes place. The maximum value of the modulation instability gain is measured, within the spectrum of the pulses exiting the fiber, for a number of values of the pulse peak power. The non-linearity coefficient $\gamma$ is obtained from the maximum measured values of modulation instability gain by minimizing the error, in the range of power values used for the measurement, with respect to a theoretical curve expressing such maximum gain as a function of the peak power.

So far, no methods based on modulation instability have been proposed for measuring γ. In fact, it is difficult to use a continuous signal for the measurement, since at the powers required to give rise to modulation instability, the so-called stimulated Brillouin effect would occur in the fiber, whereby only the power fraction corresponding to a certain threshold power would be coupled into the fiber, while the remaining power would be backscattered. By using sequences of Gaussian or hyperbolic secant pulses, as it has been done until now to study the phenomenon, on one hand it is difficult to assess pulse peak power accurately, and on the other hand there is no longer a simple relation between G, P and γ which would allow an easy determination of γ.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
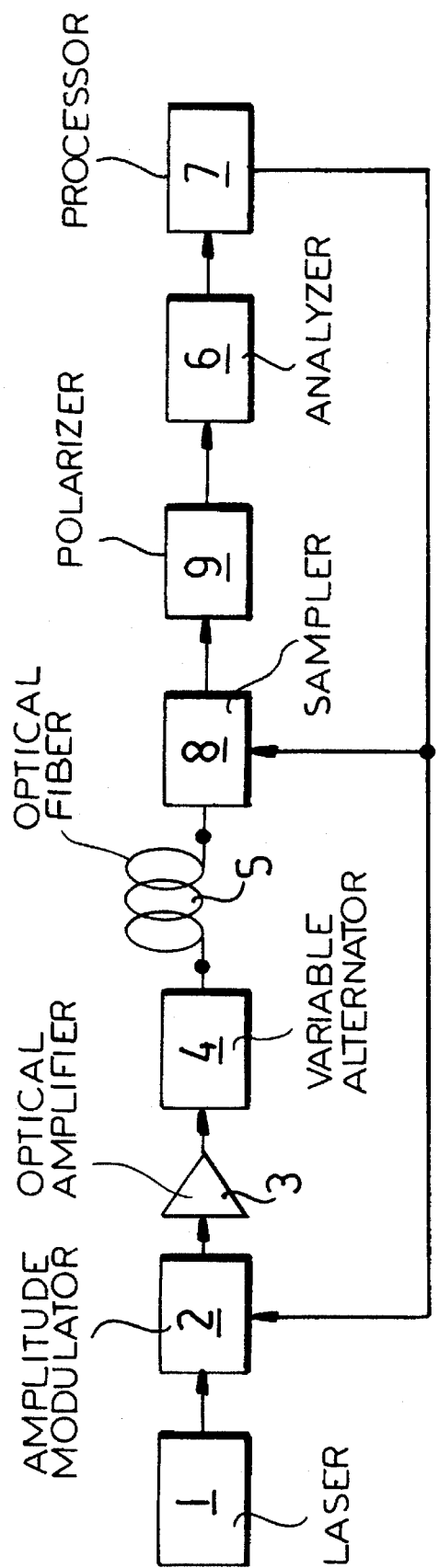
FIG. 1 is a schematic diagram of the device which performs the method.
Figure 2:
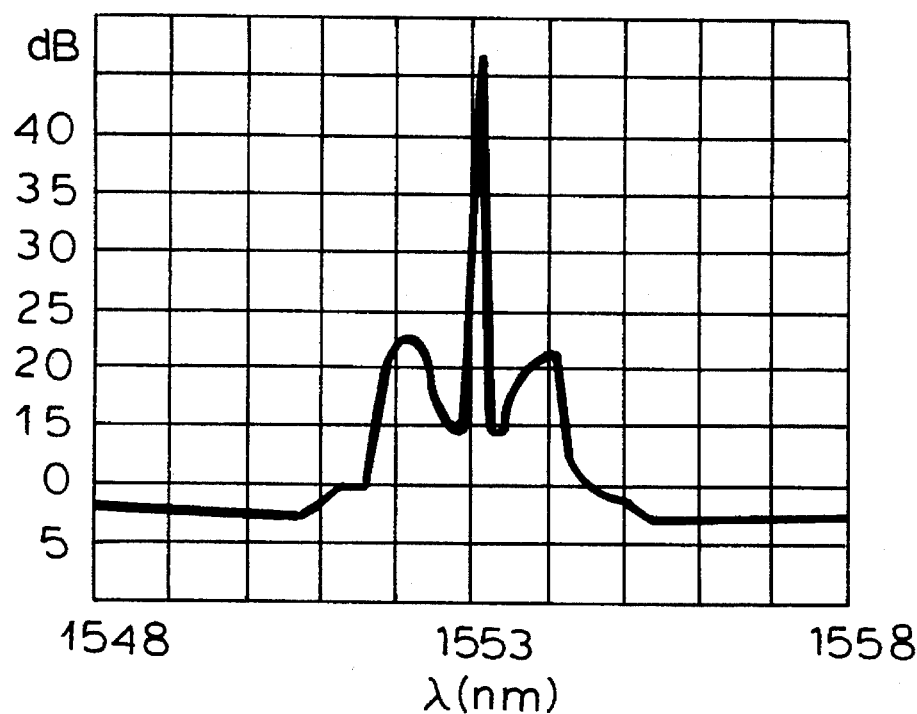
FIG. 2 depicts a typical spectrum of the signal exiting the fiber.

In FIG. 1 of the drawing, thin lines indicate the path of the optical signals and thick lines represent electrical connections. A source 1, for instance a distributed feedback laser, generates a continuous signal which is sent to an amplitude modulator 2, which transforms the continuous signal into a train of rectangular pulses with duration t and repetition period T. The train of rectangular pulses is amplified in an optical amplification stage 3, which brings the pulses to such a power level as to cause modulation instability in the fiber 5 under test. The amplified signal is sent into fiber 5 through a variable attenuator 4, which allows selection of different values for the average power. At the output of the fibers, a signal with an optical spectrum like that depicted in FIG. 2 is obtained. It has two side bands, symmetrical with respect to the line of the carrier and due to non linear amplification of the background noise produced by optical amplifier 3. The signal leaving fiber 5 is collected by an optical spectrum analyzer 6, or by another instrument capable of determining maximum gain G in correspondence with the two side bands as peak power P (given by the product of the average power by the inverse T/t of the duty cycle) varies. A processing system 7, associated with analyzer 6 and driving modulator 2, obtains the value of γ by minimizing, in the range of variation of P, the differences between the experimental values and the theoretical curve $$G(P)=1+\eta(e^{2\gamma aPL_{\mathit{eff}}}-1) \qquad (4)$$

where η is a coefficient of proportionality, which is linked to pulse duty cycle and whose value takes into account the polarisation state of the signals, $\underline{a}$ is the coefficient defined above and $L_{\mathit{eff}}$ is the effective length of fiber 5, also defined above.

Relation (4), which applies in the case of a sequence of rectangular pulses, can be obtained from relation (3), which applies for a continuous signal, through simple physical considerations, by taking into account that the spectrum of the light entering the fiber comprises the monochromatic signal emitted by laser 1 and amplified by amplifier 3 and the amplified spontaneous emission of the amplifier, and that the noise of the amplified spontaneous emission is actually amplified as an effect of modulation instability only when it superimposed in time to a pulse (i.e. for time t during period T) and it has the same polarization state as the pulse. It should also be specified that G(P) is an average value of the maximum modulation instability gain, since the radiometers present in spectrum analyzer 6 measure average power.

For the modulation instability phenomenon to take place, fiber 5 must operate under anomalous dispersion conditions, i.e. wavelength λ, of the radiation sent into the fiber must be higher than zero dispersion wavelength $\lambda_0$. This can easily be obtained with sources emitting radiations with wavelengths within the third window (about 1.55 μm), as required by erbium-doped fiber amplifiers, which are the most commonly used amplifiers.

Another important factor for the use of rectangular pulses is the ratio between duration t and period T of the pulses exiting the modulator. In particular, period T must be much smaller than the relaxation time of optical amplifiers 3, to avoid pulse distortions due to the gain dynamics of the amplifiers. If this condition for T is met, the amplifiers are only responsive to the average power of the signal. The high peak powers needed to observe non linear phenomena are therefore obtained by reducing ratio t/T. Suitable values are a few hundreds of nanoseconds for T and a few tens of nanoseconds for t. Wide tolerances are possible both for t and T.

Figure 3:
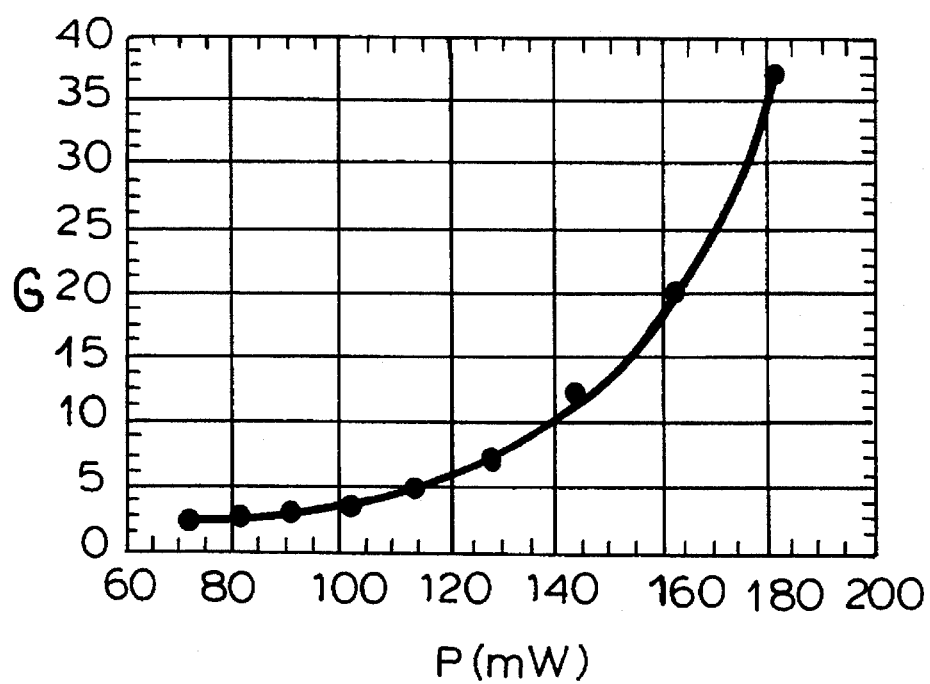
FIG. 3 is a graph which compares experimental data with the theoretical curve of the modulation instability gain.

In an exemplary embodiment of the invention, the fiber was 10.1 km long and its zero dispersion wavelength was $\lambda_0$=1539 nm, the source wavelength was λ=1553 nm, the pulses duration was t=25 ns and the period was T=250 ns; peak power was made to vary from 60 to 200 mW. FIG. 2 depicts the spectrum of a pulse at the output of the fiber for a peak power of 180 mW. The measure refers only to the polarization parallel to the signal. FIG. 3 shows a certain number of measured values of G in the conditions specified above, and the theoretical curve. The measurement accuracy allowed by the invention can clearly be seen. A fiber of the length given above, together with modulation of the source, allows the stimulated Brillouin effect to be suppressed.

It is evident that the description above is provided solely by way of non limiting example and that variations and modifications are possible without departing from the scope of the invention. Thus for instance, if fiber 5 is followed by a sampler 8 driven by processing system 7 synchronously with modulator 2 and by a polarization control device with a polarizer (represented schematically together by block 9) to select only the radiation which is polarized like the input signal, it will be possible to use relation (3) directly to obtain γ. Alternatively, it is also possible to use only sampler 8 or only the polarization control device and the polarizer: only the theoretical relation linking G(P) to γ will vary.

We claim:

1. A method of measuring the Kerr non-linearity coefficient in a single-mode optical fiber, comprising the steps of:

(a) launching into a single-mode optical fiber whose Kerr non-linearity coefficient is to be measured input optical signals in the form of rectangular high-power optical pulses of a wave-length causing the optical fiber to operate in an anomalous dispersion condition and at a peak power of the pulses as to cause modulation instability in the optical fiber;

(b) analyzing a spectrum of output optical signals exiting from said optical fiber to measure a maximum value of a modulation instability gain for a plurality of values of peak power of said input optical signals; and (c) obtaining the Kerr non-linearity coefficient γ from the measured maximum values of modulation instability gain by minimizing, in a range of power values used for measurement, the error with respect to a theoretical curve expressing such maximum gain as a function of peak power.

2. The method defined in claim 1 wherein the output signals of the fiber are sampled synchronously with the generation of the rectangular pulses.

3. The method defined in claim 1 wherein the output signals analyzed in step (b) are selected to be of the same polarization as the input signals launched into said optical fiber.

4. A device for measuring the Kerr non-linearity coefficient in a single-mode optical fiber, comprising:

means for generating and launching into a single-mode optical fiber whose Kerr non-linearity coefficient is to be measured input optical signals in the form of rectangular high-power optical pulses of a wavelength causing the optical fiber to operate in an anomalous dispersion condition and at a peak power of the pulses as to cause modulation instability in the optical fiber;

means for varying the peak power of the pulses of said input signals;

means for analyzing a spectrum of output optical signals exiting from said optical fiber to measure a maximum value of a modulation instability gain for a plurality of values of peak power of said input optical signals; and processing means connected with said means for analyzing, for obtaining the Kerr non-linearity coefficient γ from the measured maximum values of modulation instability gain by minimizing, in a range of power values used for measurement, the error with respect to a theoretical curve expressing such maximum gain as a function of peak power.

5. The device defined in claim 4, further comprising between the fiber and the means for analyzing the spectrum, a sampler operated synchronously with the means for generating the rectangular pulses, and means for selecting, in the output signals from the fiber, only the light having the same polarization as the input signals.

* * * * *